No. 707,378. Patented Aug. 19, 1902.
E. BELLEDIN-GRAS & F. S. DE MONDRAN.
TIRE FOR VEHICLE WHEELS.
(Application filed May 10, 1902.)
(No Model.) 2 Sheets—Sheet 1.
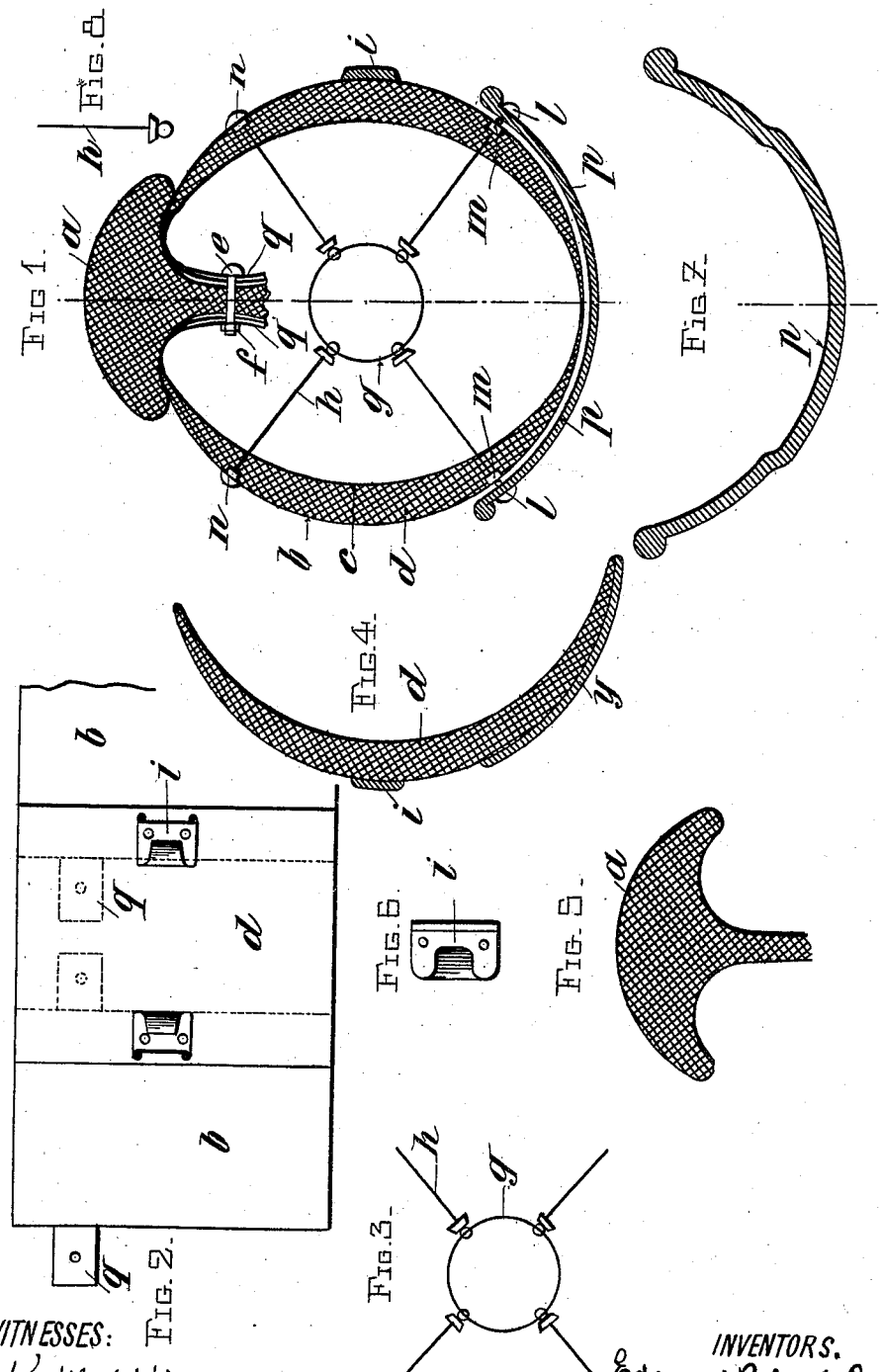
WITNESSES:
Thos. Kirkpatrick
H. Van Heerenbrinck
INVENTORS.
Edouard Belledin-Gras
Frederick Schauflin de Mondran
by Alexander & Co.
ATTORNEYS.

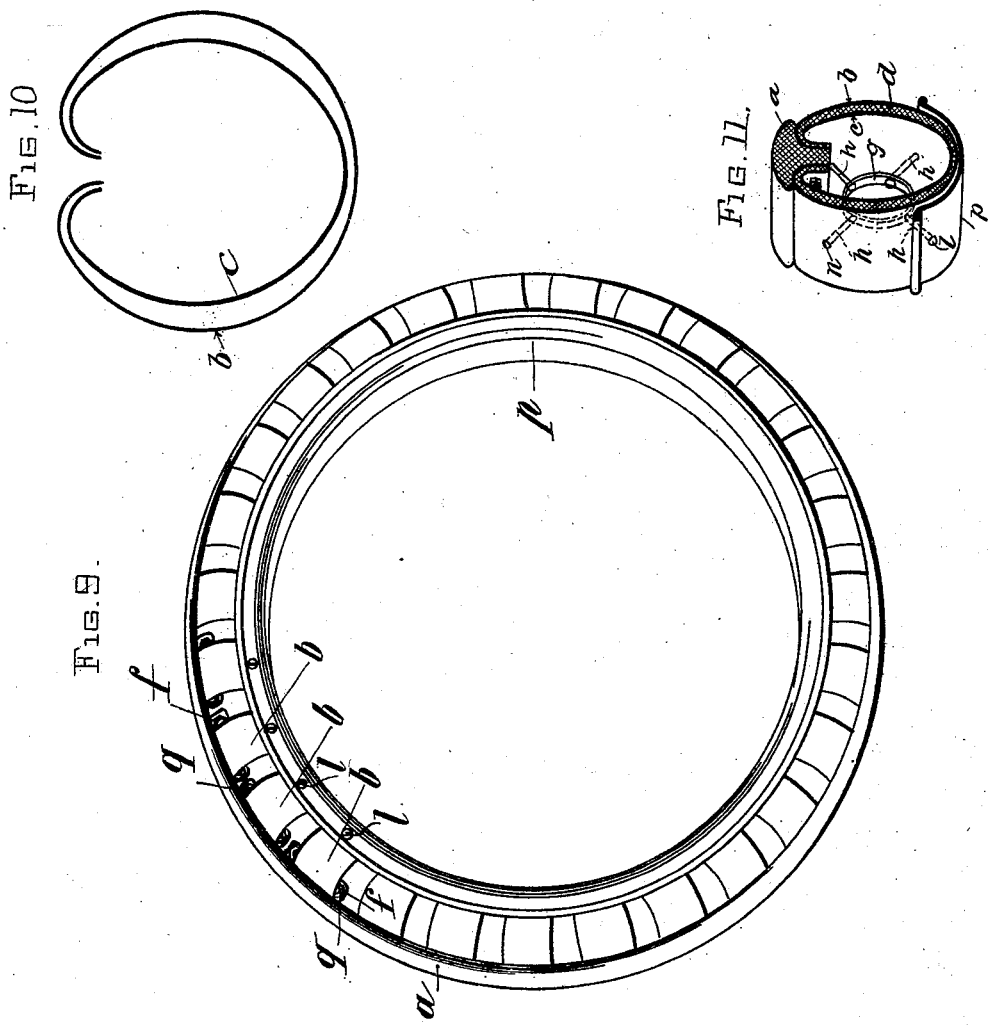

UNITED STATES PATENT OFFICE.

EDOUARD BELLEDIN-GRAS AND FREDERICK SCHAUBLIN DE MONDRAN, OF PARIS, FRANCE.

TIRE FOR VEHICLE-WHEELS.

SPECIFICATION forming part of Letters Patent No. 707,378, dated August 19, 1902.

Application filed May 10, 1902. Serial No. 106,805. (No model.)

*To all whom it may concern:*

Be it known that we, EDOUARD BELLEDIN-GRAS, engineer, a citizen of the Republic of France, and FREDERICK SCHAUBLIN DE MONDRAN, engineer, a citizen of the Swiss Confederation, residing at 160 Faubourg St. Honoré, Paris, in the Republic of France, have invented a new and useful Improvement Relating to Tires for Vehicle-Wheels, which is fully set forth in the following specification.

This invention relates to a novel elastic tire for the wheels of vehicles of all kinds.

In order that our invention may be readily and clearly understood, we have represented this novel form of tire, by way of example, in the accompanying drawings, in which—

Figure 1 is a cross-section through the tire. Fig. 2 is a partial side elevation. Fig. 3 is a detail view showing the central reinforcing-ring. Fig. 4 is a section through a filling member which, arranged between two spring members of the tire, imparts the requisite continuity to this latter. Figs. 5, 6, 7, and 8 are detail views. Fig. 9 is a general perspective view of the wheel, the filling members being removed. Fig. 10 is a detail view of the springs $b$ $c$ detached; and Fig. 11 is a sectional view, partly in perspective, showing the formation of the wheel.

Our novel tire is essentially constituted by a series of flat springs $b$ $c$, fixed at intervals to the rim $p$ by means of bolts $l$ and set-screws $m$. At the upper portion the springs $b$ $c$ are curved and provided with ears $q$ for the reception of the bolts $e$ and nuts $f$, fixing the springs to the india-rubber tire $a$. For heavy loads the number of these springs $b$ $c$ may be increased. The springs may be arranged in the same manner as those employed for the flat suspension-springs of vehicles, with or without the interposition between them of india-rubber filling members $d$. In order to increase the strength of the whole without prejudicially affecting the elasticity, we arrange at the center of the tire for each set of springs a ring $g$, connected by means of rods $h$ to the outer springs $b$. India-rubber members $d$, Fig. 4, are prepared in advance, so that they may, after the tire has been mounted, be placed between two consecutive springs $b$, Fig. 2. These filling members are maintained by means of hooks $i$, fixed upon the said members and engaging in counterparts fixed to the springs themselves. The employment of these filling members prevents the penetration of any foreign substance within the tire.

Upon the separating members $d$, Fig. 4, are formed protuberances $y$, preventing water from entering between these filling members and the rim.

What we claim, and desire to secure by Letters Patent of the United States, is—

1. An elastic tire for vehicle-wheels comprising superposed flat springs, a tread-surface with which such springs are connected at their periphery, said springs being curved to follow the inner profile of the mass constituting the tread, a series of central rings, one ring for each set of superposed springs with their respective central rings: substantially as described.

2. An elastic tire for vehicle-wheels comprising sets of springs, each composed of an outer and inner spring with interposed flexible pieces between them, a suitable flexible tread-surface connected at the periphery of said springs, central rings, one for each set of springs, and rods connecting the springs with the rings: substantially as described.

3. An elastic tire for vehicle-wheels comprising sets of springs, each composed of an outer and inner spring with interposed flexible pieces between them, a suitable flexible tread-surface connected at the periphery of said springs, central rings, one for each set of springs, and rods connecting the springs with the rings, the vacant spaces longitudinal of the tire between each two sets of superposed springs, being provided with flexible filling material.

In testimony whereof we have signed this specification in the presence of two subscribing witnesses.

EDOUARD BELLEDIN-GRAS.
FREDERICK SCHAUBLIN DE MONDRAN.

Witnesses:
EMILE LEDRET,
EDWARD P. MACLEAN.